(12) United States Patent
Melekian et al.

(10) Patent No.: US 12,331,820 B2
(45) Date of Patent: Jun. 17, 2025

(54) METHOD OF MAKING AN INTERAXLE DIFFERENTIAL UNIT AND AN ANNULAR CASE

(71) Applicant: ArvinMeritor Technology, LLC, Troy, MI (US)

(72) Inventors: Joseph Melekian, Troy, MI (US); Bin Hu, Troy, MI (US); Nagaraja Gargeshwari, Troy, MI (US)

(73) Assignee: ArvinMeritor Technology, LLC, Troy, MI (US)

( * ) Notice: Subject to any disclaimer, the term of this patent is extended or adjusted under 35 U.S.C. 154(b) by 270 days.

(21) Appl. No.: 17/196,178

(22) Filed: Mar. 9, 2021

(65) Prior Publication Data

US 2022/0290750 A1 Sep. 15, 2022

(51) Int. Cl.
*F16H 48/38* (2012.01)
*B23P 15/14* (2006.01)
*C21D 1/22* (2006.01)
*C21D 9/32* (2006.01)
*C21D 6/00* (2006.01)

(52) U.S. Cl.
CPC .............. *F16H 48/38* (2013.01); *B23P 15/14* (2013.01); *C21D 1/22* (2013.01); *C21D 9/32* (2013.01); *C21D 6/004* (2013.01); *C21D 6/005* (2013.01); *C21D 6/008* (2013.01); *F16H 2048/382* (2013.01); *Y10T 29/49464* (2015.01); *Y10T 29/49471* (2015.01)

(58) Field of Classification Search
CPC .... F16H 2048/382; F16H 48/08; F16H 48/00; F16H 48/38; F16H 48/40; F16H 2048/387; B21B 1/42; B21B 17/02; B21D 51/10; B21D 28/26; B23P 15/14
See application file for complete search history.

(56) References Cited

U.S. PATENT DOCUMENTS

| | | | |
|---|---|---|---|
| 3,700,082 A * | 10/1972 | Schwab | F16H 48/24 74/650 |
| 5,442,977 A | 8/1995 | Danjou et al. | |
| 6,940,056 B2 * | 9/2005 | Christofis | C21D 5/00 219/652 |
| 8,398,520 B1 | 3/2013 | Bassi et al. | |
| 9,708,678 B2 * | 7/2017 | Löcker | C21D 8/0247 |
| 9,719,563 B2 | 8/2017 | Hirao | |

(Continued)

FOREIGN PATENT DOCUMENTS

CN 109351896 A 2/2019
CN 210799941 U 6/2020

(Continued)

OTHER PUBLICATIONS

India First Examination Report dated Sep. 20, 2022 for India Application No. 202214011830; 6 pages.

(Continued)

*Primary Examiner* — Christopher J. Besler
(74) *Attorney, Agent, or Firm* — Brooks Kushman PC

(57) ABSTRACT

A method of making an interaxle differential unit. The method may include piercing a workpiece and then ring roll forging the workpiece to form an annular case that is a seamless ring. The annular case may be heat treated before installing an interaxle differential unit gear nest inside the annular case.

20 Claims, 5 Drawing Sheets

(56) References Cited

U.S. PATENT DOCUMENTS

| | | | |
|---|---|---|---|
| 9,816,603 | B2 | 11/2017 | Hayes et al. |
| 10,113,628 | B2 | 10/2018 | Kluck et al. |
| 10,156,289 | B2 | 12/2018 | De Stefani et al. |
| 10,208,846 | B2 | 2/2019 | Chinitz |
| 10,364,872 | B2 | 7/2019 | Keeney et al. |
| 10,369,885 | B2 | 8/2019 | Keeney et al. |
| 10,378,634 | B2 | 8/2019 | Kluck et al. |
| 10,539,218 | B2 | 1/2020 | Annigeri et al. |
| 10,703,202 | B2 | 7/2020 | Funderburg et al. |
| 2007/0191171 | A1* | 8/2007 | Pascoe .................. B21K 21/02 475/230 |
| 2010/0083783 | A1* | 4/2010 | Szuba .................... B21D 22/16 72/283 |
| 2012/0000314 | A1* | 1/2012 | Cripsey ................ F16H 48/40 74/607 |
| 2012/0279268 | A1* | 11/2012 | Loveless ................. B21B 5/00 72/69 |
| 2015/0141194 | A1* | 5/2015 | Radzevich ........... B60K 17/165 475/230 |
| 2015/0183065 | A1* | 7/2015 | Chavdar ................. B21K 1/30 74/460 |
| 2019/0248234 | A1* | 8/2019 | Funderburg ............ F16H 48/08 |
| 2021/0048094 | A1 | 2/2021 | Andres et al. |

FOREIGN PATENT DOCUMENTS

| | | |
|---|---|---|
| CN | 112122543 A | 12/2020 |
| GB | 2155867 A | 10/1985 |
| JP | H08312753 A | 11/1996 |
| JP | 2001087836 A2 | 4/2001 |
| WO | 2017005740 A1 | 1/2017 |

OTHER PUBLICATIONS

U.S. Appl. No. 16/827,102, filed Mar. 23, 2020; 35 Pages.
Hayes et al.—U.S. Appl. No. 16/827,102, filed Mar. 23, 2020; 46 Pages.
Extended European Search Report and Written Opinion for Application No. 22159901.2, dated Aug. 11, 2022, 8 pages.
Brazilian Preliminary Office Action dated Apr. 15, 2024 for Brazilian Application No. BR102022004215-2; 6 pages.
Chinese Office Action dated Nov. 5, 2024 for Chinese Application No. 202210210619.X; 26 pages.
Chinese Office Action dated Feb. 19, 2025 for Chinese Application No. 202210210619.X; 26 pages.
Chinese Office Action dated Apr. 26, 2025 for Chinese Application No. 202210210619.X; 15 pages.

* cited by examiner

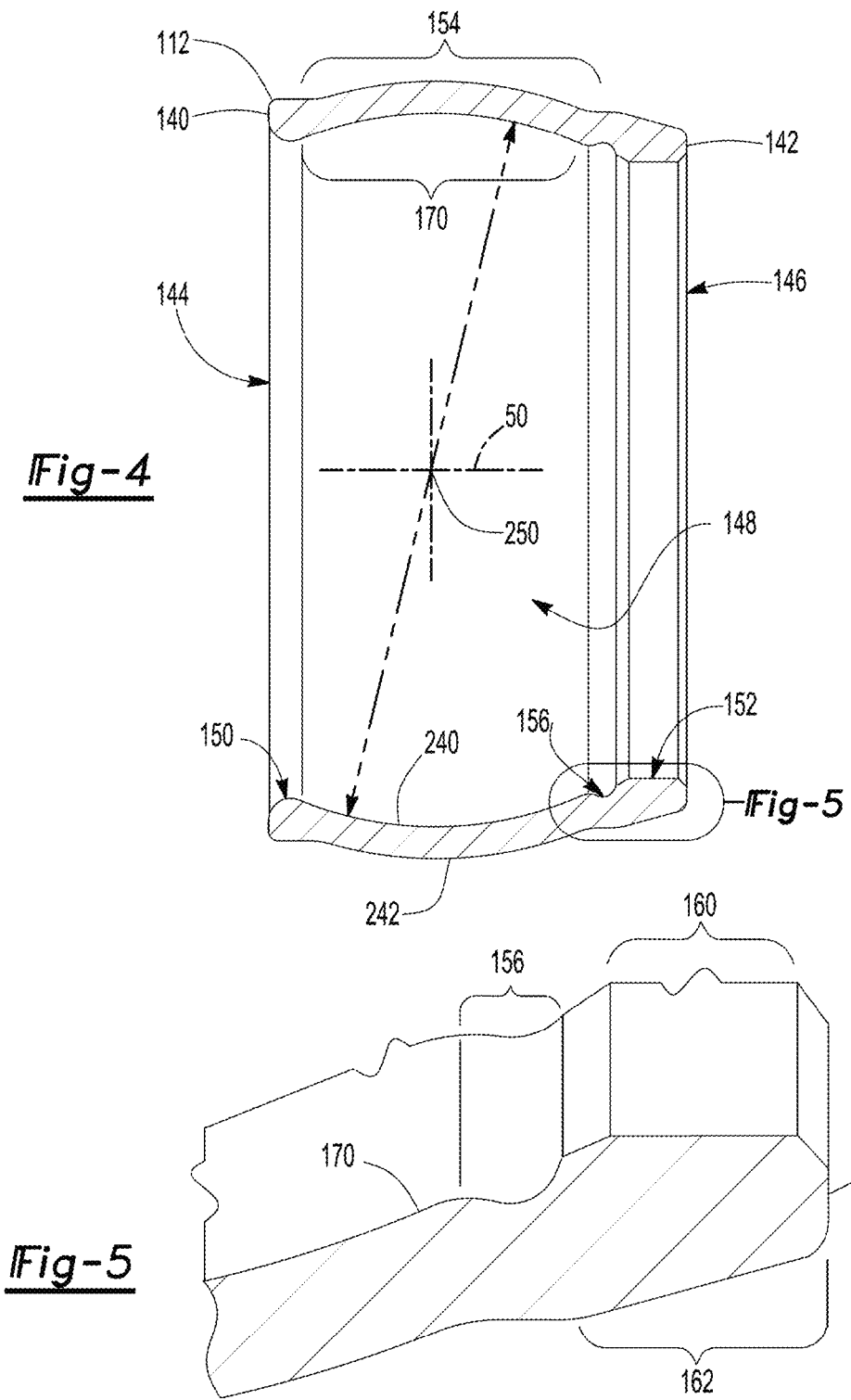

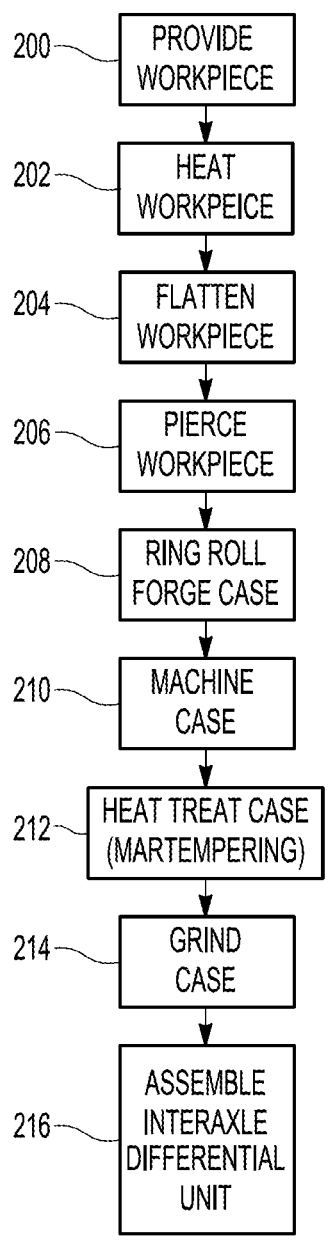
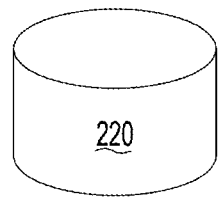
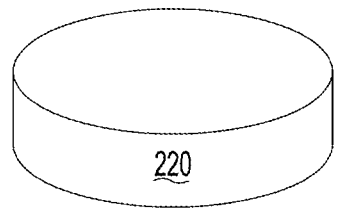
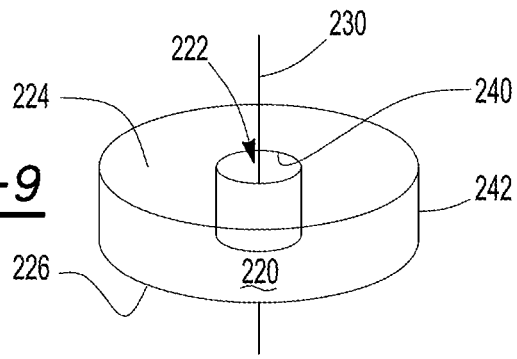
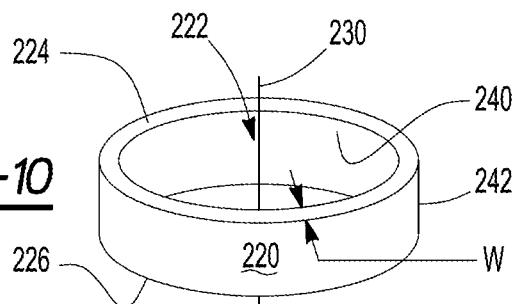
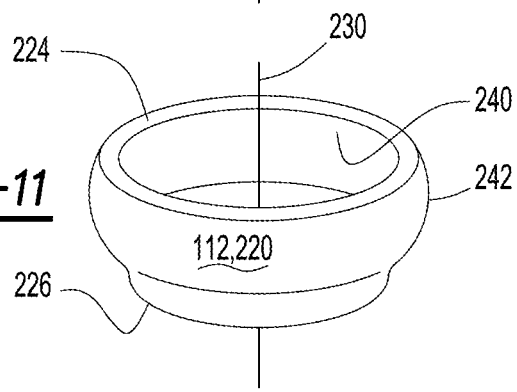

METHOD OF MAKING AN INTERAXLE DIFFERENTIAL UNIT AND AN ANNULAR CASE

TECHNICAL FIELD

This relates to a method of making an interaxle differential unit and an annular case of the interaxle differential unit.

BACKGROUND

An axle assembly having an interaxle differential unit is disclosed in U.S. Pat. No. 9,816,603.

SUMMARY

In at least one embodiment a method of making an interaxle differential unit is provided. The method may include piercing a workpiece to form a through hole. The workpiece may be roll forged to form an annular case that is a seamless ring. The annular case may be heat treated after ring roll forging. An interaxle differential unit gear nest may be subsequently installed inside the annular case.

BRIEF DESCRIPTION OF THE DRAWINGS

FIG. 4 is a section view of an annular case of the interaxle differential unit.

FIG. 5 is a magnified view of a portion of FIG. 4.

FIG. 6 is a flowchart of a method of making the annular case and the interaxle differential unit.

FIGS. 7-11 are images associated with some of the method steps.

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Figure 1:
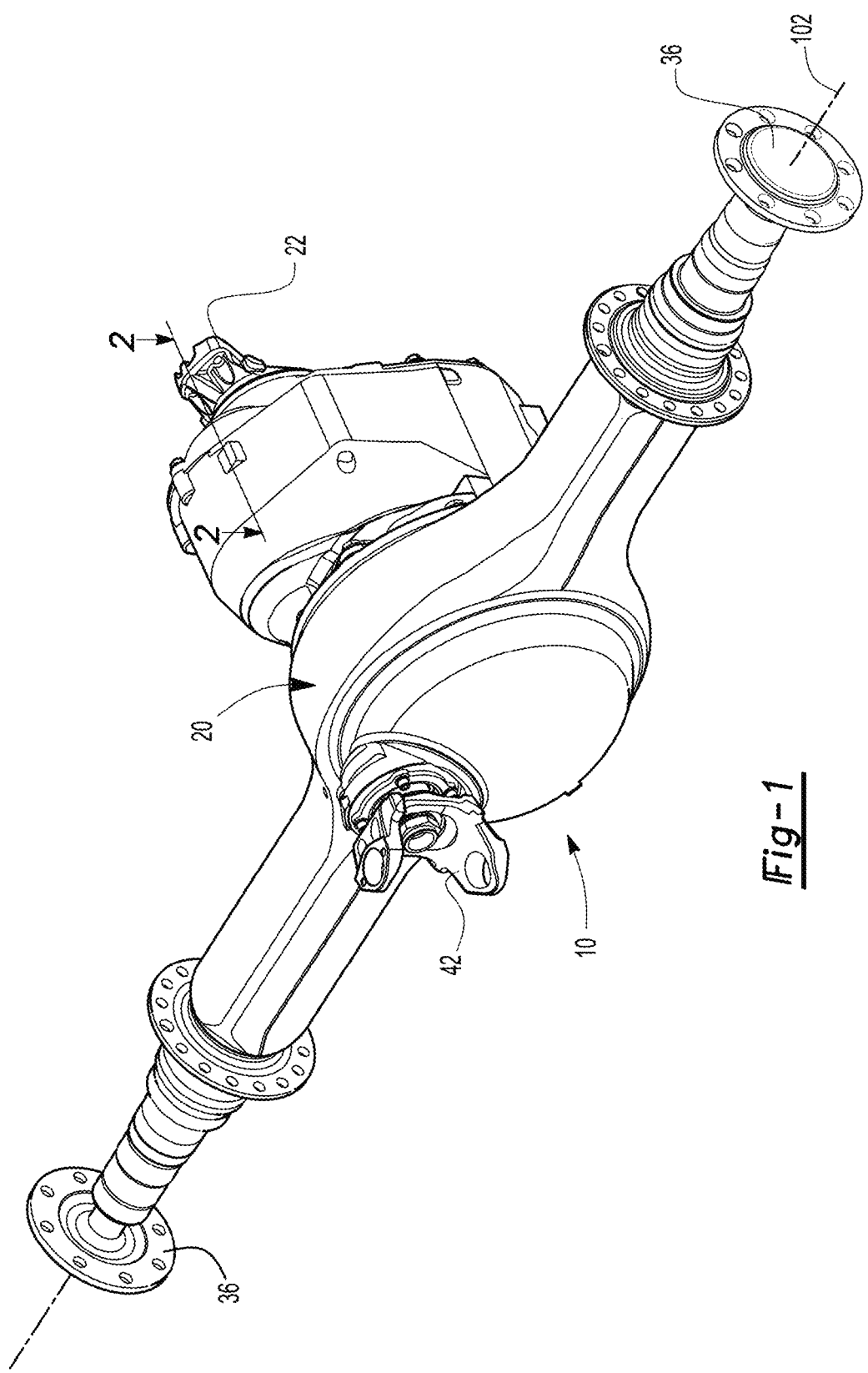
FIG. 1 is a perspective view of an example of an axle assembly.

Referring to FIG. 1, an example of an axle assembly 10 is shown. The axle assembly 10 may be provided with a vehicle of any suitable type, such as a truck, bus, farm equipment, military transport or weaponry vehicle, or cargo loading equipment for land, air, or marine vessels.

The axle assembly 10 may be part of a vehicle drivetrain that may include multiple axle assemblies that may be connected in series. For instance, the axle assembly 10 may be part of a tandem axle configuration that may include two axle assemblies connected in series. The axle assembly 10 that is operatively connected to at least one torque source, such as an electric motor or an internal combustion engine, may be referred to as a first axle assembly. The axle assembly that receives propulsion torque from the torque source by way of the first axle assembly may be referred to as a second axle assembly. In FIG. 1, the axle assembly 10 is depicted as being a first axle assembly.

The axle assembly 10 may provide torque to its associated wheel assemblies and may provide torque to the second axle assembly. In at least one embodiment and as is best shown with reference to FIGS. 1 and 2, the axle assembly 10 may include a housing 20, an input yoke 22, an input shaft 24, a first gear 26, a clutch collar 28, a driven gear 30, a drive pinion 32, a differential assembly 34, at least one axle shaft 36, an interaxle differential unit 38, an output shaft 40, an output yoke 42, or combinations thereof. These components are shown to facilitate an abbreviated discussion of the operation of the axle assembly 10.

Referring to FIG. 1, the housing 20 may receive various components of the axle assembly 10. In addition, the housing 20 may facilitate mounting of the axle assembly 10 to the vehicle.

The input yoke 22 may facilitate coupling of the axle assembly 10 to a torque source. The input yoke 22 may be operatively connected to the input shaft 24. It is contemplated that the input yoke 22 may be omitted, such as when a torque source like an electric motor is integrated with the axle assembly 10.

Figure 2:
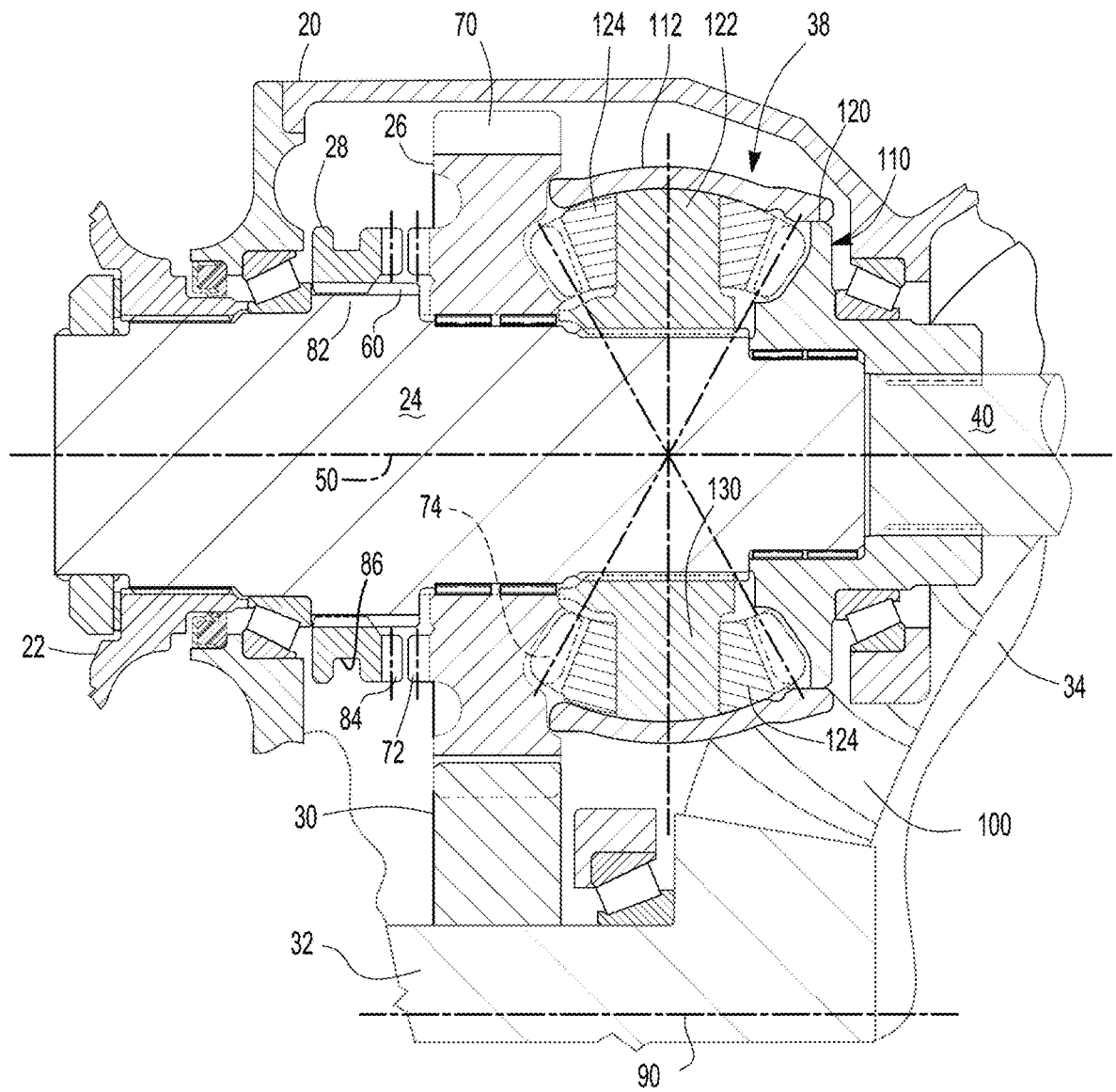
FIG. 2 is a section view of a portion of the axle assembly along section line 2-2 showing an example of an interaxle differential unit.
Figure 3:
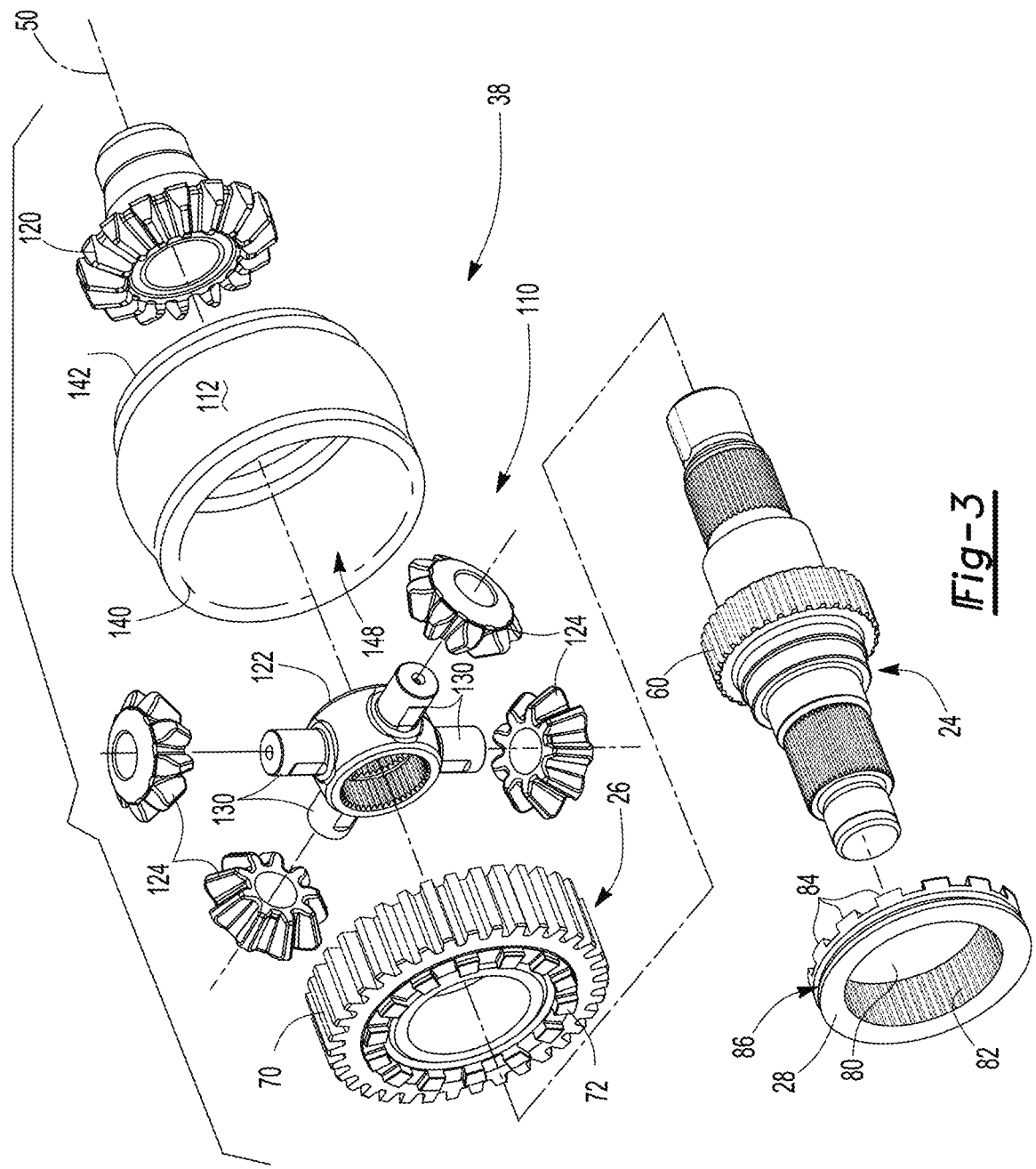
FIG. 3 is an exploded view that includes the interaxle differential unit.

Referring to FIGS. 2 and 3, an example of an input shaft 24 is shown. The input shaft 24 may extend along and may be configured to rotate about an axis 50. For example, the input shaft 24 may be rotatably supported by one or more bearings that may be disposed on the housing 20. The input shaft 24 may be operatively connected to the interaxle differential unit 38. In at least one configuration, the input shaft 24 may include a first spline 60 that may engage the clutch collar 28.

Referring to FIGS. 2 and 3, the first gear 26, which may also be referred to as a drive gear, may be part of an interaxle differential unit gear nest of the interaxle differential unit 38 as will be discussed in more detail below. The first gear 26 may be rotatable about the axis 50. In addition, the first gear 26 may be selectively coupled to the input shaft 24 with the clutch collar 28. For instance, the first gear 26 may be rotatable about the axis 50 with the input shaft 24 when the clutch collar 28 couples the first gear 26 to the input shaft 24 and the first gear 26 may be rotatable about the axis 50 with respect to the input shaft 24 when the clutch collar 28 does not couple the first gear 26 to the input shaft 24. In at least one configuration, the first gear 26 may have a center bore that may receive the input shaft 24 and optionally a bearing that may rotatably support the first gear 26 on the input shaft 24. In at least one configuration, the first gear 26 may include outer gear teeth 70, face gear teeth 72, and side gear teeth 74.

The outer gear teeth 70 may engage and may mesh with teeth on the driven gear 30. The outer gear teeth 70 may extend away from the axis 50 and may be arranged around an outside diameter of the first gear 26.

The face gear teeth 72 may include a set of teeth that may be arranged on a side or face of the first gear 26 that may face away from the interaxle differential unit 38 and toward the clutch collar 28. The face gear teeth 72 may selectively engage teeth on the clutch collar 28, such as when the clutch collar 28 couples the first gear 26 to the input shaft 24.

Referring to FIG. 3, the side gear teeth 74 may be disposed on an opposite side of the first gear 26 from the face gear teeth 72. The side gear teeth 74 may be arranged around the axis 50 and may face toward gears that may be disposed inside the interaxle differential unit 38.

Referring to FIGS. 2 and 3, the clutch collar 28, if provided, may be moveable along the axis 50 to engage or disengage the first gear 26. In at least one configuration, the clutch collar 28 may be generally ring-shaped and may define a clutch collar hole 80, a clutch collar spline 82, a clutch collar face gear 84, and an annular groove 86.

Referring to FIG. 3, the clutch collar hole 80 may extend around the axis 50. The clutch collar hole 80 may receive the input shaft 24.

Referring to FIGS. 2 and 3, the clutch collar spline 82 may be disposed in the clutch collar hole 80. The clutch collar spline 82 may include a plurality of spline teeth that may extend toward the axis 50 and that may mate or mesh with the teeth of the first spline 60 of the input shaft 24. As such, the clutch collar 28 may be rotatable about the axis 50 with the input shaft 24 and may be moveable along the axis 50 or moveable in an axial direction with respect to the input shaft 24.

The clutch collar face gear 84 may include a set of teeth that may be arranged around the axis 50 and that may face toward and extend toward the face gear teeth 72 of the first gear 26. The teeth of the clutch collar face gear 84 may selectively engage the teeth of the face gear teeth 72 of the first gear 26.

The annular groove 86 may receive a linkage, such as a fork, that may operatively connect the clutch collar 28 to an actuator that may position the clutch collar 28 along the axis 50.

Referring to FIG. 2, the driven gear 30 may be rotatable about a second axis 90. For example, the drive pinion 32 may be received in a center bore of the driven gear 30 and the driven gear 30 may be fixedly disposed on the drive pinion 32 or may be couplable to the drive pinion 32 such that the driven gear 30 and the drive pinion 32 may rotate together about the second axis 90. The driven gear 30 may include a plurality of teeth that may be generally arranged about an outside diameter of the driven gear 30 and that may mate or mesh with the teeth of the outer gear teeth 70 of the first gear 26. Only a portion of the driven gear 30 disposed above the second axis 90 is shown in FIG. 2. The second axis 90 may be disposed substantially parallel to the axis 50. The term "substantially parallel" as used herein means the same as or very close to parallel and includes features or axes that are within ±2° of being parallel each other.

The drive pinion 32 may operatively connect the torque source to the differential assembly 34. The drive pinion 32 may be spaced apart from the input shaft 24 and may be configured to rotate about an axis, such as a second axis 90. The drive pinion 32 may rotate with the driven gear 30. It is also contemplated that the drive pinion 32 may rotate about the axis 50 in other configurations, such as when the first gear 26 and the driven gear 30 are omitted or when the output shaft 40 extends through the drive pinion 32. A gear portion may be disposed at an end of the drive pinion 32.

The differential assembly 34 may be at least partially received in the housing 20. Only a portion of the differential assembly 34 is shown. The differential assembly 34 may be rotatable about an axis, such as a differential axis that may be disposed substantially perpendicular to the second axis 90. The term "substantially perpendicular" is used herein to designate features or axes that are the same as or very close to perpendicular and includes features that are within ±2° of being perpendicular each other. The differential assembly 34 may transmit torque to the axle shafts 36 and wheels. For example, the differential assembly 34 may be operatively connected to the axle shafts 36 and may permit the axle shafts 36 to rotate at different rotational speeds in a manner known by those skilled in the art. The differential assembly 34 may have a ring gear 100 that may have teeth that may mate or mesh with the teeth of the gear portion of the drive pinion 32. Accordingly, the differential assembly 34 may receive torque from the drive pinion 32 via the ring gear 100 and transmit torque to the axle shafts 36.

Referring to FIG. 1, the axle shafts 36 may transmit torque from the differential assembly 34 to corresponding wheel hubs and wheels. The axle shafts 36 may extend along and may be rotatable about a third axis 102, which may be the differential axis. Each axle shaft 36 may have a first end and a second end. The first end may be operatively connected to the differential assembly 34. The second end may be disposed opposite the first end and may be operatively connected to a wheel.

Referring to FIGS. 2 and 3, an example of an interaxle differential unit 38 is shown. The interaxle differential unit 38 may accommodate or compensate for rotational speed differences between different drive axle assemblies, such as speed differences between the axle assembly 10 and a second axle assembly that is connected in series with the axle assembly 10. The interaxle differential unit 38 may be provided in various locations. In FIG. 3, the interaxle differential unit 38 is disposed inside the housing 20 on the input shaft 24; however, it is contemplated that the interaxle differential unit 38 may be provided in other locations, such as closer to the output yoke 42 or with the second axle assembly. It is also contemplated that interaxle differential unit 38 may be disposed on a shaft other than the input shaft 24. In at least one configuration, the interaxle differential unit 38 may include an interaxle differential unit gear nest 110 and an annular case 112.

The interaxle differential unit gear nest 110 may include a plurality of gears that may operatively connect the input shaft 24 to the output shaft 40. In at least one configuration, the interaxle differential unit gear nest 110 may include a second gear 120, a spider 122, and a plurality of pinion gears 124. The interaxle differential unit gear nest 110 may also include the first gear 26.

The second gear 120 may be disposed proximate the input shaft 24. For example, the second gear 120 may extend along the axis 50 and may have a center bore that may receive and/or support an end of the input shaft 24. A bearing may be provided in the center bore between the input shaft 24 and second gear 120 to facilitate alignment and relative rotation. The center bore may also include a spline or splined portion that may be spaced apart from the input shaft 24 and that may receive and engage a corresponding spline on another shaft, such as the output shaft 40. As such, the second gear 120 may not rotate about the axis 50 with respect to the output shaft 40.

Referring to FIGS. 2 and 3, the spider 122 may be fixedly disposed on the input shaft 24. For instance, the spider 122 may include a center bore that may include splines that may mate with corresponding splines on the input shaft 24 to help align and secure the spider 122 to the input shaft 24. As such, the spider 122 may rotate about the axis 50 with the input shaft 24. The spider 122 may also include one or more pins 130 that may extend away from the center bore of the spider 122.

One or more pinion gears 124 may be rotatable with respect to the spider 122. A pinion gear 124 may be rotatably disposed on a pin 130. The pinion gear 124 may include teeth that may mesh or mate with the side gear teeth 74 of the first gear 26 and may mesh or mate with teeth of the second gear 120.

The annular case 112 may receive the interaxle differential unit gear nest 110. The annular case 112 may be a continuous seamless ring that may be made from a single piece of material and may not be an assembly of multiple parts. As such, the annular case 112 may not have free ends that meet each other and may be free of welds or joining seams. In addition, the cross-sectional profile of the annular case 112 around the axis 50 may be constant or symmetrical as is best shown in FIG. 4. In at least one configuration and as is best shown with reference to FIGS. 3 and 4, the annular case 112 may have a first end surface 140, a second end surface 142, a first opening 144, a second opening 146, and may define an annular case cavity 148. The annular case 112 may also include a first enlarged lip 150, a second enlarged lip 152, a center portion 154, an annular groove 156, or combinations thereof.

The first end surface 140 may be disposed at a first end of the annular case 112. For instance, the first end surface 140 may face toward the first gear 26. The first end surface 140 may extend around the axis 50 and may encircle the first opening 144. In addition, the first end surface 140 may be disposed substantially perpendicular to the axis 50.

The second end surface 142 may be disposed at an opposite end of the annular case 112 from the first end surface 140. As such, the second end surface 142 may face away from the first gear 26. The second end surface 142 may extend around the axis 50 and may encircle the second opening 146. In addition, the second end surface 142 may be disposed substantially perpendicular to the axis 50.

Referring to FIG. 4, the first opening 144 may extend around the axis 50. The first opening 144 may be encircled by the first end surface 140. In at least one configuration, the first opening 144 may have a larger diameter than the second opening 146.

The second opening 146 may be disposed at an opposite end of the annular case 112 from the first opening 144. The second opening 146 may extend around the axis 50. The second opening 146 may be encircled by the second end surface 142. In at least one configuration, the first opening 144 and the second opening 146 may be the only holes or openings in the annular case 112. As such, no other through holes or blind holes may be provided in or defined by the annular case 112.

The first enlarged lip 150 may extend from the first end surface 140. The first enlarged lip 150 may have a greater wall thickness than the center portion 154. In at least one configuration, the first enlarged lip 150 may extend in an axial direction between the first end surface 140 and the center portion 154 and may extend radially from a curved interior surface that may face toward the axis 50 to an exterior surface that may extend substantially parallel to the axis 50.

The second enlarged lip 152 may extend from the second end surface 142. The second enlarged lip 152 may have a greater axial length than the first enlarged lip 150. In at least one configuration and as is best shown in FIG. 5, the second enlarged lip 152 may have an inner lip surface 160 and an outer lip surface 162. The inner lip surface 160 may encircle the axis 50 and may extend substantially parallel to the axis 50. The outer lip surface 162 may be disposed in a nonparallel relationship with the inner lip surface 160. For example, the outer lip surface 162 may extend at an angle with respect to the axis 50 such that the outer lip surface 162 extends further from the axis 50 as the distance from the second end surface 142 increases.

The center portion 154 may be axially positioned between the first enlarged lip 150 and the second enlarged lip 152.

The center portion 154 may have a part-spherical surface 170 that may face toward the axis 50. The part-spherical surface 170 may extend continuously around the axis 50 and may be disposed at a substantially constant radial distance from a center point 250 that may be positioned along the axis 50. For instance, the part-spherical surface 170 may resemble a portion of a sphere and may extend around a spherical segment, which may be a portion of a sphere that may be disposed between two substantially parallel planes that may be disposed substantially perpendicular to the axis 50.

Referring primarily to FIG. 5, the annular groove 156 may be axially positioned between the second enlarged lip 152 and the part-spherical surface 170 of the center portion 154. The annular groove 156 may face toward the axis 50 and may extend outward or away from the axis 50 with respect to the part-spherical surface 170 and may extend from an end of the part-spherical surface 170. The annular groove 156 may also be disposed further from the axis 50 than the inner lip surface 160.

Referring to FIG. 2, the output shaft 40 may extend along and may be configured to rotate about the axis 50. For instance, the output shaft 40 may be supported by one or more bearings that may be disposed on the housing 20. The output shaft 40 may be coupled to the interaxle differential unit 38. For example, the output shaft 40 may be fixedly coupled to the second gear 120.

Referring to FIG. 1, the output yoke 42 may facilitate coupling of the axle assembly 10 to another axle assembly. For instance, the output yoke 42 may be fixedly coupled to the output shaft 40 and may be operatively connected to a second axle assembly in any suitable manner, such as via a prop shaft.

Referring to FIG. 6, a flowchart of a method of making an interaxle differential unit is shown. Many steps of the method are associated with making the annular case 112. Pictorial representations of some of these steps are shown in FIGS. 7-11.

At block 200, a workpiece may be provided. An example of a workpiece 220 is shown in FIG. 7. The workpiece 220 a single piece of material that may be made of ASTM 52100 bearing steel. The workpiece 220 may be a piece of bar stock that may be cut to a predetermined length. The workpiece 220 may have any suitable cross-sectional shape. For instance, the workpiece 220 may have a cylindrical cross section.

At block 202, the workpiece 220 may be heated to soften the material and facilitate forming. For example, the workpiece 220 may be heated in a furnace in a manner known by those skilled in the art.

At block 204, the workpiece 220 may be flattened. An example of a flattened workpiece 220 is shown in FIG. 8. The workpiece 220 may be flattened after the workpiece 220 is heated. The workpiece 220 may be flattened to form a generally cylindrical solid disc that may have an increased diameter and a reduced height as compared to FIG. 7. The workpiece 220 may be flattened in any suitable manner, such as with rollers, a forging press, or the like.

At block 206, the workpiece 220 may be pierced. An example of a pierced workpiece 220 is shown in FIG. 9. Piercing the workpiece 220 may create a through hole 222 at or near the center of the workpiece 220. The through hole 222 may be disposed along a center axis 230. The workpiece 220 may be pierced after the workpiece 220 has been heated and flattened. The workpiece 220 may be pierced in any suitable manner, such as with a tool like a piercing die that may be inserted from the top side 224 to the bottom side 226 of the workpiece 220. The workpiece 220 may be a seamless ring that may have a generally rectilinear cross-section after piercing and may include an inner side 240 that may face toward the center axis 230 and an outer side 242 that may be disposed opposite the inner side 240 and that may face away from the center axis 230.

At block 208, the workpiece 220 may be ring roll forged to form the annular case. Ring roll forging may occur after the workpiece 220 has been heated and pierced and may include a sequence of ring roll forging steps.

For instance, a first ring roll forging step may reduce the wall thickness W of the workpiece 220, may increase the inside diameter of the workpiece 220 or diameter of the through hole 222, and may increase the outside diameter of the workpiece 220 as shown in FIG. 10. The workpiece 220 may have a different rectilinear cross-section after the first ring roll forging step as compared to the cross-section of the workpiece 220 after piercing. The ring roll forging steps may be accomplished using a plurality of rollers in a manner known by those skilled in the art. For example, an axial roller may roll along the top side 224, the bottom side 226, or both. An idler roller and a drive roller may roll along the inner side 240 and the outer side 242, respectively, and may move away from the center axis 230 of the through hole 222 during ring roll forging to increase the inside diameter and the outside diameter of the workpiece 220 and to help reduce the wall thickness W of the workpiece 220. The inner side 240 may be disposed substantially parallel to the outer side 242 during the first ring roll forging step. The workpiece 220 may be rotated about the center axis 230 during ring roll forging.

The workpiece 220 may undergo one or more additional ring roll forging steps to change the rectilinear cross-section to a non-rectilinear cross-section. For instance, one or more additional ring roll forging steps may contour the inner side 240 and the outer side 242 and alter the wall thickness W therebetween to provide a desired cross-sectional shape, such as that shown in FIG. 4. Such steps may also be accomplished using a plurality of rollers in a manner known by those skilled in the art. For instance, a sequence of rollers may roll along the inner side 240 and the outer side 242 to progressively form the inner side 240 and the outer side 242 to a desired cross sectional profile such as is shown in FIG. 4. The workpiece 220 may be referred to as an annular case after ring roll forging is complete. An example of the workpiece 220 after ring roll forging is shown in FIG. 11. The top side 224 or a portion thereof may become or may be referred to as a first end surface 140 of the annular case that is shown in FIG. 4 after ring roll forging is complete. Similarly, the bottom side 226 or a portion thereof may become or may be referred to as a second end surface 142 of the annular case after ring roll forging is complete.

In the cross sectional profile shown in FIG. 4, the majority of the inner side 240 may not be disposed parallel to the outer side 242 in contrast to the generally parallel positioning that may be associated with the first ring roll forging step as shown in FIG. 10. For instance forming the cross sectional profile may include increasing the inside diameter of the inner side 240 between the first end surface 140 and the second end surface 142, such as at the part-spherical surface 170 such that at least a portion of the inner side 240 may have a larger diameter than the first end surface 140 and the second end surface 142. As such, the first opening 144 and the second opening 146 may have smaller diameters than a portion of the inner side 240 that is axially positioned between them.

The workpiece 220 may be annealed after ring roll forging is complete to strengthen the workpiece 220 and to facilitate material handling.

At block 210, the workpiece 220 may be machined. Machining may remove material from predetermined locations of the workpiece 220. For instance, material may be removed from the first end surface 140, the second end surface 142, or both, after ring roll forging and before heat treating. Any suitable material removal process may be used. For example, material may be removed with a cutting tool in a manner but known by those skilled in the art.

At block 212, the workpiece 220 may be heat treated to harden the workpiece 220. Heat treating may include martempering the entire workpiece 220 and thus the entire annular case. For example, the workpiece 220 may be heated above the upper critical point of the material from which it is made. For instance, the workpiece 220 may be heated to a temperature of 830° C. to 845° C. to austenitize the workpiece in a neutral atmosphere to prevent decarbonization of the workpiece. The workpiece may be held at this temperature until the temperature becomes uniform throughout the cross section of the workpiece 220. Then, the workpiece 220 may then be quenched in a salt, oil, or lead bath having a temperature of 5° C. to 15° C. below the martensite start temperature of the material from which the workpiece 220 is made. The workpiece 220 may be quenched for a predetermined period of time, such as approximately 4-5 minutes. Then, the workpiece 220 may be allowed to air cool to room temperature or ambient temperature. The workpiece 220 may have a surface hardness and an internal hardness or core through hardness of at least HRC 60 after heat treating. The workpiece 220 may then be tempered after quenching. For instance, the workpiece 220 may be tempered at a temperature of 175° C. to 185° C. for approximately 250 to 260 minutes within one hour of quenching.

At block 214, the grinding of the workpiece 220 may occur. Grinding may remove material from predetermined locations of the workpiece 220. For example, the first end surface 140, the second end surface 142, or both, may undergo grinding after heat treating to provide a desired surface finish that may facilitate operation of the interaxle differential unit when in use.

At block 216, the interaxle differential unit may be assembled. The interaxle differential unit may be assembled by installing the interaxle unit differential gear nest 110 inside the annular case 112. For instance, one or more pinion gears 124 may be mounted on the spider 122, the spider 122 and pinion gears 124 may be inserted through an opening of the annular case 112, such as the first opening 144, and into the annular case 112, and gears such as the first gear 26 and the second gear 120 may be brought into engagement with the pinion gears 124 by inserting them into the first opening 144 and the second opening 146, respectively.

The present invention may allow an interaxle differential unit to be provided with a one-piece annular case that may be manufactured more efficiently and may require fewer assembly steps than multi piece case designs. In addition, an annular case and an interaxle differential unit may be provided with less weight, which may help reduce material usage and vehicle energy consumption. The annular case may have improved durability as compared to multi case designs or interaxle differential unit cases that may be made of heat treat cast iron. For instance, the inner side of the annular case may better withstand friction associated with rotating pinion gears, which may rotate at high speeds during spinout conditions in which the rotational speed of one axle assembly greatly differs from another that is connected in series. As a result, wear or damage to the annular case caused by spinning pinion gears may be reduced or avoided, thereby increasing the durability and potential life of the interaxle differential unit.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A method of making an interaxle differential unit, the method comprising:
   piercing a workpiece to form a through hole;
   ring roll forging the workpiece to form an annular case that is a seamless ring that comprises an outer side and an inner side that is disposed opposite the outer side and faces toward a center axis, wherein ring roll forging the workpiece to form the annular case comprises forming the outer side and the inner side to form a cross sectional profile, and wherein forming the cross sectional profile includes increasing an inside diameter of the inner side between a first end surface of the annular case and a second end surface of the annular case that is disposed opposite the first end surface such that at least a portion of the inner side has a larger diameter than a first opening that is encircled by the first end surface and a second opening that is encircled by the second end surface;
   heat treating the annular case; and
   installing an interaxle differential unit gear nest inside the annular case.

2. The method of claim 1 wherein heat treating the annular case comprises martempering the entire annular case to a temperature that is uniform throughout the cross sectional profile.

3. The method of claim 2 wherein the first opening and the second opening are the only holes in the annular case.

4. The method of claim 2 wherein the interaxle differential unit gear nest includes a first gear and a second gear, wherein the first gear is received in the first opening and the second gear is received in the second opening.

5. The method of claim 4 wherein the interaxle differential unit gear nest includes a spider and a pinion gear, wherein the pinion gear is engageable with the first gear and the second gear and is mounted on the spider such that the pinion gear is rotatable with respect to the spider and the spider and the pinion gear are installed inside the annular case before the first gear is received in the first opening.

6. The method of claim 1 further comprising heating and flattening the workpiece before piercing the workpiece.

7. The method of claim 6 wherein flattening the workpiece forms a solid disc.

8. The method of claim 1 wherein the workpiece is made of ASTM 52100 bearing steel.

9. The method of claim 1 wherein ring roll forging the workpiece includes rotating the workpiece about the center axis, increasing a diameter of the through hole, and increasing an outside diameter of the workpiece to reduce a wall thickness of the workpiece between the diameter of the through hole and the outside diameter of the workpiece.

10. The method of claim 9 wherein the outside diameter is defined by the outer side and the diameter of the through hole is defined by the inner side that is disposed substantially parallel to the outer side.

11. The method of claim 10 wherein ring roll forging the workpiece further comprises forming the outer side and the inner side to form the cross sectional profile in which a majority of the inner side is not disposed parallel to the outer side after increasing the diameter and the outside diameter and reducing the wall thickness of the workpiece.

12. The method of claim 1 further comprising removing material from the first end surface and the second end surface after ring roll forging and before heat treating the annular case.

13. The method of claim 12 wherein the annular case has a surface and core through hardness of at least HRC 60 after heat treating.

14. The method of claim 12 wherein the annular case is made of ASTM 52100 bearing steel and heat treating the annular case includes heating the annular case to 830° C. to 845° C. in a neutral atmosphere to prevent decarburization and quenching the annular case in a bath having a temperature of 5° C. to 15° C. below a martensite start temperature of the ASTM 52100 bearing steel.

15. The method of claim 12 further comprising grinding the first end surface of the annular case after heat treating and before installing the interaxle differential unit gear nest.

16. The method of claim 1 wherein ring roll forging the workpiece to form the annular case comprises forming a first enlarged lip that extends from the first end surface, a second enlarged lip that extends from the second end surface, a center portion that comprises a part-spherical surface that extends from the first enlarged lip, and an annular groove that extends from the second enlarged lip to the part-spherical surface, wherein the first enlarged lip and the second enlarged lip have a greater wall thickness than the center portion of the annular case.

17. A method of making an interaxle differential unit, the method comprising:
   piercing a workpiece to form a through hole;
   ring roll forging the workpiece to form an annular case that is a seamless ring, wherein the annular case includes a first end surface that encircles a first opening, a second end surface that encircles a second opening, a first enlarged lip that extends from the first end surface, a second enlarged lip that extends from the second end surface, a part-spherical surface that extends from the first enlarged lip, and an annular groove that extends from the second enlarged lip to the part-spherical surface, wherein the first opening has a larger diameter than the second opening, wherein the annular groove is axially positioned closer to the second end surface than to the first end surface;
   heat treating the annular case; and
   installing an interaxle differential unit gear nest inside the annular case.

18. The method of claim 16 wherein the second enlarged lip has a greater axial length than the first enlarged lip, and the second enlarged lip includes an inner lip surface that encircles an axis and that extends substantially parallel to the axis and an outer lip surface that is disposed in a nonparallel relationship with the inner lip surface and that extends further from the axis as a distance from the second end surface increases.

19. The method of claim 17 wherein the first and second openings extend around an axis and the annular groove is disposed closer to the axis than a portion of the part-spherical surface.

20. The method of claim 19 wherein the first enlarged lip is disposed closer to the axis than the part-spherical surface where the first enlarged lip meets the part-spherical surface and an inner lip surface of the second enlarged lip that faces toward the axis is disposed closer to the axis than the part-spherical surface and the annular groove.

* * * * *